A. P. BROOMELL.
AUTOMATIC HEATING SYSTEM.
APPLICATION FILED MAR. 16, 1914.
1,236,257.
Patented Aug. 7, 1917.
4 SHEETS—SHEET 4.
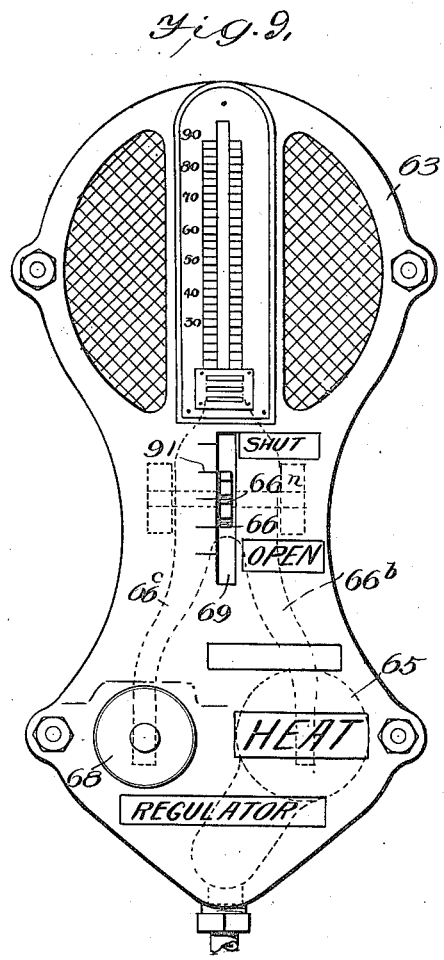
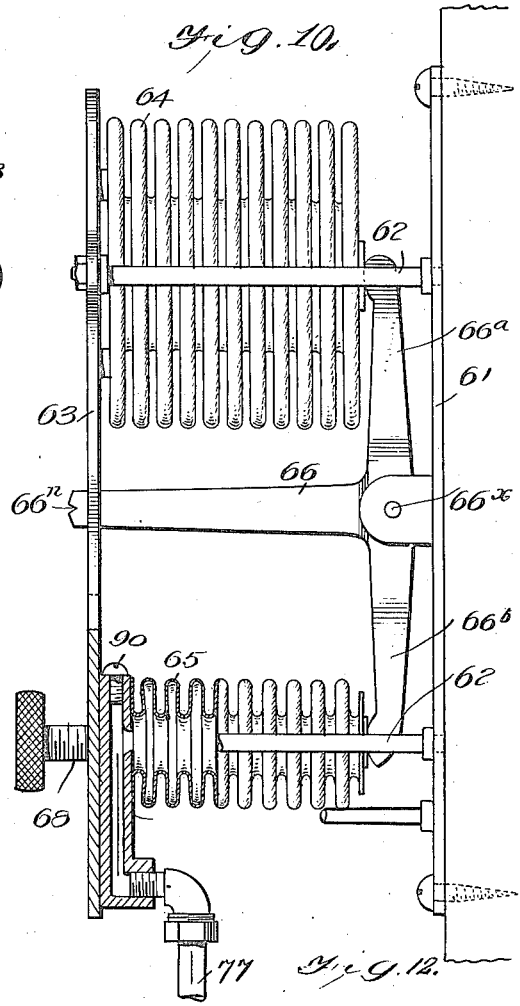
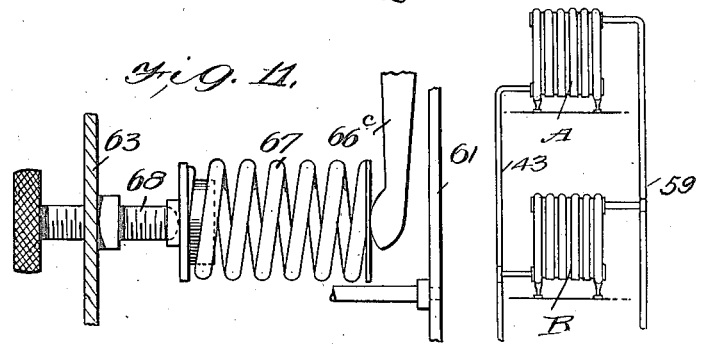
INVENTOR
Albert P. Broomell
BY Munn & Co.
ATTORNEYS

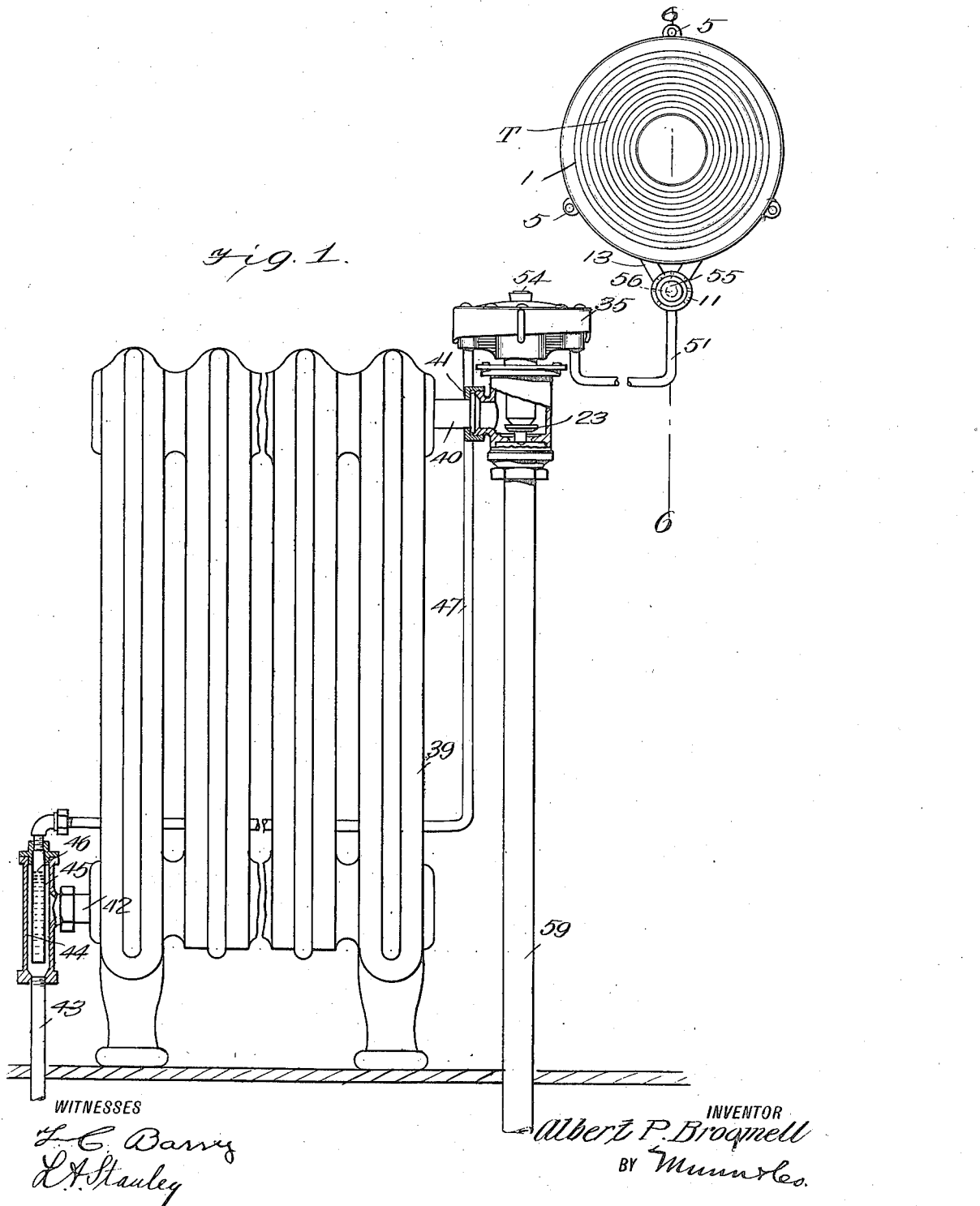

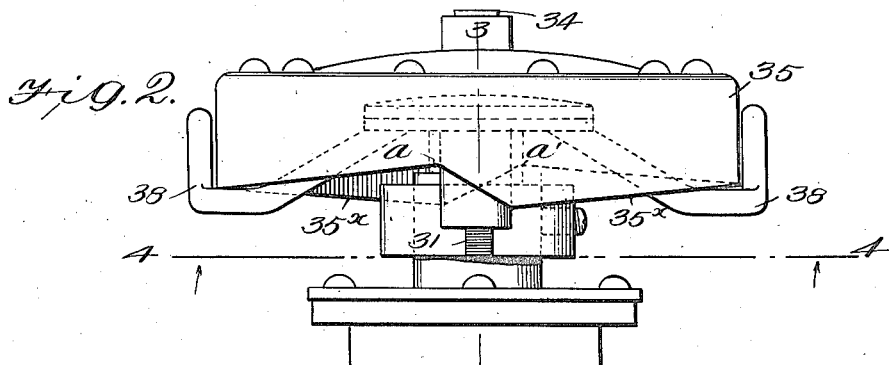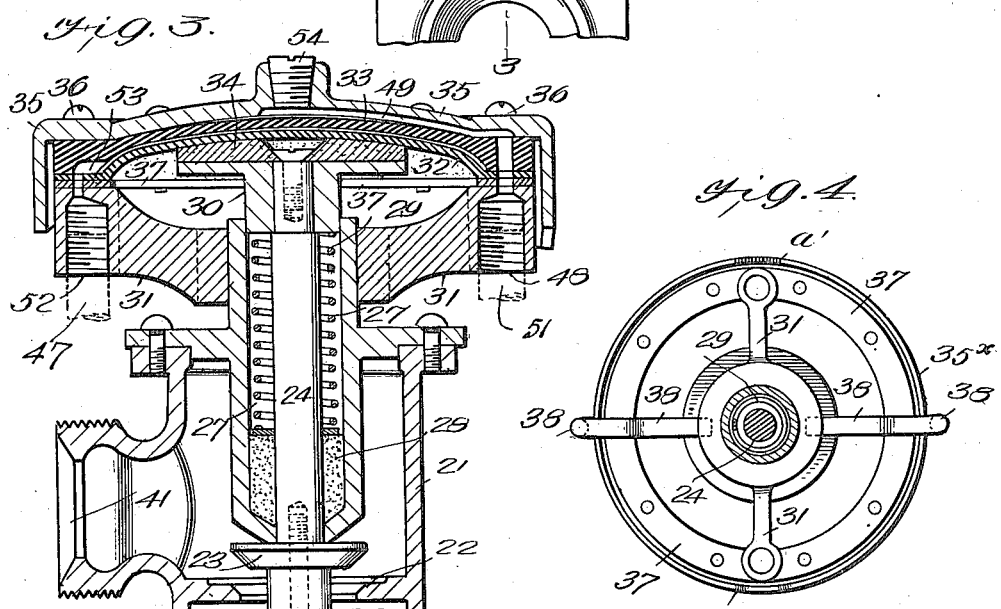

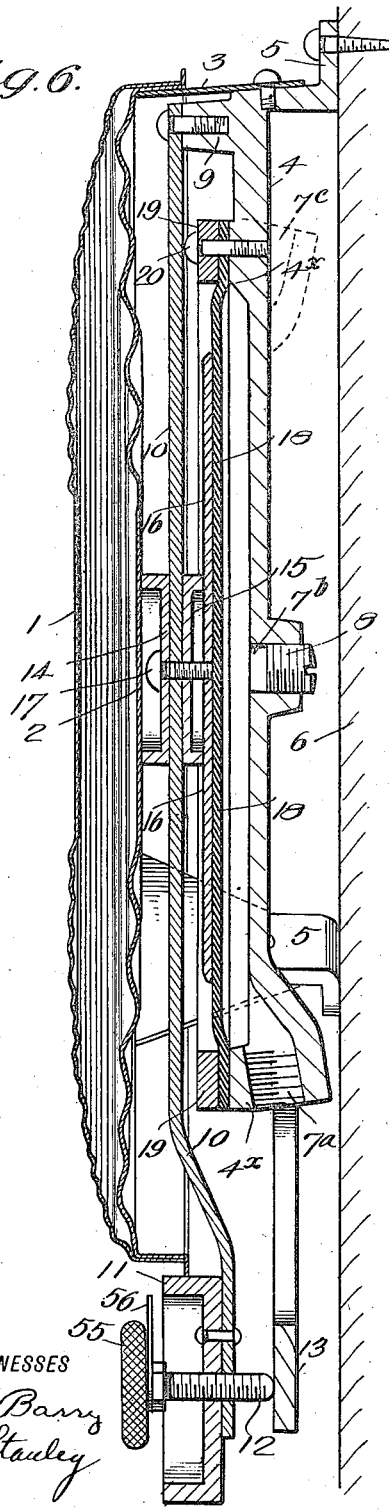

UNITED STATES PATENT OFFICE.

ALBERT P. BROOMELL, OF YORK, PENNSYLVANIA.

AUTOMATIC HEATING SYSTEM.

1,236,257.  Specification of Letters Patent.  Patented Aug. 7, 1917.

Application filed March 16, 1914. Serial No. 824,968.

*To all whom it may concern:*

Be it known that I, ALBERT P. BROOMELL, a citizen of the United States, and a resident of York, in the county of York and State of Pennsylvania, have made certain new and useful Improvements in Automatic Heating Systems, of which the following is a specification.

My invention relates to improvements in automatic heating systems, especially in those heating systems in which steam is used as a heating medium of the so-called low pressure or vacuum type.

An object of my invention is to provide means whereby the radiators of a system may be completely filled with steam, without permitting any of the steam to escape to the outer atmosphere through the "return" pipe.

A further object of my invention is to provide a system of the type described, in which there is no possibility of the steam, which has once passed into a radiator, short circuiting the system, that is to say, working back into a radiator which might be shut off, from the return end, and heating the radiator up. I accomplish the above named objects by providing a device at the "return" end of a radiator which regulates the amount of steam delivered to the radiator.

A further object of my invention is to provide a thermostatic element which is designed to operate (by means of fluid pressure) a valve at the radiator for turning on or cutting off the supply of steam from the latter, the movement of the thermostat being multiplied in the valve, so that for a very slight movement of the thermostatic member the valve will be positively operated from its open position to its closed position or to any position between the two.

Other objects and advantages will appear in the following specification and the novel features of the device will be particularly pointed out in the appended claims.

My invention is illustrated in the accompanying drawings forming part of this application in which Figure 1 is a view of the general arrangement of the system, certain parts being shown in section, Fig. 2 is a side view in detail of the radiator valve mechanism, Fig. 3 is a section along the line 3—3 of Fig. 2, Fig. 4 is a section along the line 4—4 of Fig. 2, Fig. 5 is a perspective view of the means for manually operating the valve, Fig. 6 is a sectional view through the thermostat, Fig. 7 is a front view of the thermostat, the outer diaphragms being removed, Fig. 8 is a rear view of the thermostat, Fig. 9 is a face view of a modified form of thermostat, Fig. 10 is a side view of the thermostat shown in Fig. 9, a portion of the device being shown in section, Fig. 11 is a fragmentary view showing a portion of the regulating means for the thermostat set forth in Figs. 9 and 10, Fig. 12 is a diagrammatic view showing a plurality of radiators connected up to a common steam pipe and a common return pipe.

Referring now particularly to Fig. 6 I have shown therein a thermostat comprising an outer diaphragm 1 and an inner diaphragm 2, the space between these two diaphragms being designed to be partially filled with a volatile liquid. The edges of these diaphragms, as will be seen from the drawing, fit over a casing wall 3 which is secured to a base plate 4, the latter having lugs 5 by means of which it may be attached to the wall 6, or other convenient support. The base plate is provided with a lower opening 7ª, a central opening 7ᵇ, and an upper opening 7ᶜ. Screw plugs, such as shown at 8, are to be used in connection with the device in the manner hereinafter set forth. At one end of the base plate 4 is a lug 9 upon which is mounted a spring 10, which extends to the opposite side of the device, being bent to pass out of the casing and being provided at its outer end with a dial plate 11, through which a regulating screw 12 extends. The end of this regulating screw is rounded, and is arranged to bear upon an arm 13, which is carried by the base plate 4.

Disposed centrally of the device on one side of the spring 10 is a shoe 14 which is designed to bear against the diaphragm 2, while on the opposite side of the spring is a shoe 15 which bears upon a steel plate 16, the shoes 14 and 15, and the steel plate 16 being secured together by means of a screw 17.

The base plate 4 is provided with an annular flange 4ˣ upon which is placed the outer edge of a circular resilient diaphragm 18, such as rubber or the like. This diaphragm is held in place by means of a ring 19, screws 20 being provided for clamping the diaphragm 18 between the ring 19 and the annular flange 4ˣ. The space between the diaphragm 18 and the base plate 4 is designed to be filled with a fluid, as hereinafter explained.

Referring now to Figs. 2 to 5 inclusive I have shown therein a radiator valve which comprises a valve casing 21 having a valve seat 22 arranged to receive a valve 23. The latter is provided with a valve stem 24 and secured to the valve stem by means of a screw 25 is a throttling lug 26, which, as will be readily seen, partially closes the opening controlled by the valve. This lug is removable, and a larger one or a smaller one may be substituted in lieu thereof, thereby regulating the amount of steam which is permitted to pass when the valve is open. The amount of steam will, of course, depend upon the size of the radiator, and by making use of the proper sized throttling lug 26, the admission of steam, to a certain extent, can be controlled for a particular radiator. The valve stem 24 extends through a chamber 27, which contains a packing 28 at its lower end, the packing being pressed upon by a spring 29 whose upper end bears against a head 30 secured to the valve stem.

Carried by the walls of the chamber 27 are the webs 31. As will be seen from Fig. 3 there are two diaphragms, an inner diaphragm 32 and an outer diaphragm 33. The inner diaphragm engages a heat insulating plate 34 such as fiber or other suitable material, carried by the head 30. The edges of the outer and inner diaphragms are clamped between a ring 37, carried by the webs 31, and a cover 35, by means of screws 36 or other suitable fastening devices. As will be seen from Fig. 2 this cover is provided with downwardly extending flanges having cam surfaces 35ˣ on its lower edge. The head 30 is revoluble in the walls of the chamber 27, and is provided with arms 38, which extend downwardly, outwardly, and are then bent upwardly, as shown in Fig. 5. As will be seen from Fig. 2, these arms are designed to engage the cam surfaces 35ˣ, so that by turning the arms the head 30, and hence the valve 23, may be forced downwardly or be permitted to rise by the action of the spring 29, depending upon the direction in which the arms are turned.

Referring now to Fig. 1, 39 denotes a radiator whose inlet 40 is connected with the outlet 41 of the valve casing, shown in detail in Fig. 3. The outlet 42 of the radiator is connected with the "return" pipe 43, by means of a casing 44. The latter has disposed within it a closed receptacle 45 made of heat conducting material and containing a very volatile fluid 46. The upper end of the receptacle communicates by means of a pipe 47, with the inlet 52 in one of the webs 31. This in turn communicates with a space 53 between the outer diaphragm 33 and an inner diaphragm 32. The openings 7ª and 7ᵇ are for the purpose of connecting the thermostat to the radiator valve by means of a tube such as that shown at 51, see Fig. 1. Either one of these openings 7ª or 7ᵇ may be used. If the tube is unexposed, the lower opening 7ª is used and the central opening 7ᵇ is plugged. If the connecting tube is run concealed behind the plaster, the opening 7ª is plugged and the tube or pipe is connected with the opening 7ᵇ. It will be noted that the pipe 51 communicates with the inlet 48 in one of the webs 31, see Fig. 3, this inlet communicating in turn with the space 49 between the outer diaphragm 33 and the cover 35.

From the foregoing description of the various parts of the device, the operation thereof may be readily understood.

The thermostat, which I have denoted in general by T in Fig. 1, is secured in position and the apparatus is connected up, as described. The screw plug 54 in the radiator valve (see Fig. 3) is removed, and a stand pipe, of sufficient height to reach slightly above the level of the opening 7ᶜ at the top of the thermostat (see Fig. 6), is inserted in the opening from which the screw plug 54 was withdrawn. A suitable liquid such as water diluted with alcohol, light oil, or other non-freezing liquid, is now poured into the stand pipe and allowed to flow into the space 49 above the diaphragm 33, and through the pipe 51 into the space between the diaphragm 18 of the thermostat and the base plate 4. When the liquid appears at the air hole, 7ᶜ, the air will have been forced out. The hole 7ᶜ is now plugged up, and the parts all being air-tight it will now be possible to remove the stand pipe from the hole in the top of the valve and to insert the screw plug 54 without losing any of the liquid.

The thermostat may be set by turning the knob 55 to which a hand or pointer 56 is attached to the proper temperature indicated on the dial 11. Upon the position of this screw will depend the pressure of the shoe 15 upon the steel disk 16, which bears upon the diaphragm 18.

Consider now the conditions with the thermostat set—say at 70°, and the radiator valve 23 wide open. Steam is being supplied to the radiator 39 from the steam pipe 59 and as the temperature of the room rises the liquid in the thermostat between the diaphragms 1 and 2 expands and tends to exert pressure on the diaphragm 18, through the medium of the shoes 14 and 15. This will tend to force the liquid out of the thermostat and through the pipe 51 into the space 49 above the outer diaphragm, thereby crowding the latter downwardly against the inner diaphragm and forcing the valve stem downwardly, and bringing the valve in position to shut off the steam. When the temperature falls the diaphragms 1 and 2 of the thermostat will tend to come together and the spring 29 of the radiator valve will tend to force the diaphragms upwardly and thus force the liquid out of the space 49 and back into the thermostat. The action of the spring 29 will open the valve 23 and again permit the steam to enter the radiator. It will thus be seen that the action of the valve 23 depends upon the temperature and is automatic.

Let us consider now the means by which the steam in the radiator is prevented from wasting through the return pipe. As has been before stated, the retainer 45 at the end of the radiator is made of conducting material, so that when the steam begins to enter the casing 44 which surrounds the receptacle 45 the liquid within the receptacle which is very volatile begins to boil and the vapor will pass up through the pipe 47 and into the space 53 between the two diaphragms, forcing the inner diaphragm downwardly, thereby closing the valve 23 and preventing the entrance of more steam. It will be observed that this is done without disturbing the relative amounts of liquids in the thermostat and in the space 49 between the outer diaphragm and the cover 35 of the radiator valve. When the steam stops coming into the casing 44 the liquid within the receptacle 45 will cool off and the vapor pressure will be relieved, thereby opening the valve and permitting more steam to enter. By this arrangement the steam is automatically prevented from escaping through the return pipe, while at the same time the radiator is kept filled with steam, so that every bit of air has been discharged from the radiator, leaving no dead air space. Since there is no steam in the return pipe there is no danger of a short circuiting of the system, that is to say, there is no danger of the steam working back into a radiator which might be shut off and heating the radiator up again. Thus in Fig. 18 the radiators A and B are both connected to the steam pipe 59 and to the return pipe 43. Now the radiator A may be shut off, while the radiator B may be receiving steam. My invention would prevent the passage of steam from the return pipe 43 up into the radiator A, and thereby heating the radiator A.

It will be observed that the coil spring 29 serves the double function of moving the valve 23 and also of compressing the packing 28, thereby insuring against leakage. The heat insulating cover 34 prevents the destruction of the inner diaphragm 32 from the heat of the head 30 of the valve mechanism.

At times it is desirable to close the valve manually and to do this it is only necessary to turn the arms 38 to the right. This will cause them to come into engagement with the cam surfaces $35^x$, thereby forcing the arms, together with the head 30, and the valve stem, downwardly, thus bringing the valve upon its seat and shutting off the flow of steam. To open the valve the arms are rotated to the left.

In the ordinary automatic heat regulating systems, it is not possible for the occupant of the room to tell whether or not the radiator is open except by feeling the radiator to find out whether it is hot or cold. It sometimes happens that there is no steam in the supply mains of the heating system. The room may be uncomfortably cold and the occupant of the room, not knowing that there is steam in the supply mains will conclude that there is something wrong with the automatic regulating device and will probably think that the radiator valve is shut. This leads to complaint, to tampering with the apparatus, and to dissatisfaction. With the present system one can always tell whether the valve is shut or closed by observing the position of the arms 38 with respect to the edge of the cover 35. Ordinarily these arms are turned so that with the valve open they are as far to the left as they can go, i. e., at the angles $a$—$a'$ respectively made by the inclined edges of the flange of the cover 35. Any movement of the valve toward its closed position will, of course, cause the arms to move downwardly away from the edge of the flange, thereby indicating plainly the position of the valve.

A very slight movement of the thermostat diaphragm 18 will cause a multiplied movement of the valve 23. This is due to the fact that the area of the diaphragm in the thermostat is considerably larger than that of the diaphragm of the radiator valve. In practice the area of the diaphragm of the thermostat is four times that of the area of the one on the valve, so that a very small movement—say one-sixteenth of an inch—in the thermostat will move the valve stem one-quarter of an inch, thus closing it entirely. By this means I secure a multiplied movement without using levers or other devices which tend to render the device more complicated and unsatisfactory because of the friction which might be present.

In Figs. 9 and 10, I have shown a modified form of thermostat in which a base plate 61 is secured to the wall or other convenient support, and is provided with bolts or other suitable securing means 62, which hold a front plate 63. Carried by the latter is an expansion member 64 in the form of a bellows made of brass or other suitable material and designed to be filled with a volatile liquid which vaporizes at low temperature. A second bellows 65 is carried by the plate 63. At 66 I have shown a T-shaped lever, which is pivoted at 66˟, and which is provided with an arm 66ª arranged to bear on one end of the bellows 64, and an arm 66ᵇ arranged to bear on the end of the bellows 65. As will be seen from Fig. 9 there is a branch arm 66ᶜ which bears on the end of a spring 67 whose pressure may be regulated by a screw 68 passing through the plate 63. The outer end of the arm 66 extends through a slot 69 in the front plate 63, and is provided with a central notch 66ⁿ. The upper end of the slot 69 has a legend "Shut," while the lower end has a legend "Open."

It will thus be seen that I have provided a heating system of the low pressure or vacuum type in which great economy is effected owing to the fact that little, if any, steam is permitted to pass out through the return pipe into the atmosphere. This I accomplish without interfering with the free flow of steam into the radiator. The radiator, being full of steam, works at its greatest efficiency. The provision of means for indicating whether or not the radiator valve is open or shut I also regard as an important feature. While I have stated that the bellows are preferably made of brass, it will be understood, of course, that any suitable material might be used. The diaphragms also might be made of other suitable material than rubber, without departing in the least from the spirit and the scope of the invention.

I desire to call particular attention to the fact that in this system the means for preventing any steam from escaping into the return pipe is accomplished, while at the same time providing a return opening of full size. In the ordinary means for preventing steam from getting into the return line the opening from the radiator at the return end is very much contracted and is never opened except slightly. This results in the opening oftentimes being clogged up with a slight amount of sediment which is discharged from the radiator. Obviously no such contingency may happen in the present instance because of the full size opening.

I claim:

In a steam heating system, a radiator, a steam pipe, a valve casing connected with said steam pipe and said radiator, valve mechanism in said valve casing for controlling the admission of steam from said steam pipe into said radiator, said valve mechanism comprising a main valve controlling means and an auxiliary valve controlling means, a thermostat operatively connected with said main valve operating means for operating the latter at a predetermined temperature, means including a thermostat disposed at the return end of the radiator for operating said auxiliary valve controlling means independently of said first named thermostat, manual means for operating the valve independently of either of the thermostatic means, said manual means comprising an arm rigidly secured to the valve stem, and a cam surface carried by the valve casing and arranged to be engaged by the arm for moving the valve toward its seat.

ALBERT P. BROOMELL.

Witnesses:
R. P. BROWN,
WM. H. KOLB.